(12) United States Patent
Bravo et al.

(10) Patent No.: US 10,302,441 B2
(45) Date of Patent: May 28, 2019

(54) ROUTE MODIFICATION BASED ON RECEIVING A BROADCAST EMERGENCY VEHICLE ROUTE

(71) Applicant: INTERNATIONAL BUSINESS MACHINES CORPORATION, Armonk, NY (US)

(72) Inventors: Elianne A. Bravo, Fishkill, NY (US); Michael L. Greenblatt, Jefferson Hills, PA (US); Heidi Lagares-Greenblatt, Jefferson Hills, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

(21) Appl. No.: 15/276,898

(22) Filed: Sep. 27, 2016

(65) Prior Publication Data

US 2018/0087914 A1   Mar. 29, 2018

(51) Int. Cl.
*G01C 21/34* (2006.01)
*G08G 1/0968* (2006.01)
(Continued)

(52) U.S. Cl.
CPC ..... *G01C 21/3415* (2013.01); *G01C 21/3694* (2013.01); *G08G 1/0965* (2013.01); (Continued)

(58) Field of Classification Search
CPC ...... G05D 1/00; G05D 1/0088; G05D 1/0278; G05D 1/0214; G05D 1/0223; G05D 1/0287; G05D 1/02; G08G 1/0967; G08G 1/01; G08G 1/0965; G08G 1/096844; G08G 1/00; G08G 1/096791; G08G 1/127; G08G 1/0125; G08G 1/096766; G08G 1/096716; G08G 1/09675; G08G 1/096775; G08G 1/205; G08G 1/096827; G08G 1/166;
(Continued)

(56) References Cited

U.S. PATENT DOCUMENTS 6,958,707 B1    10/2005    Siegel
8,842,021 B2     9/2014    Behm et al.
(Continued)

OTHER PUBLICATIONS

Bravo et al., "Emergency Route Broadcasting ", U.S. Appl. No. 15/276,899, filed Sep. 27, 2016.
(Continued)

*Primary Examiner* — Behrang Badii
(74) *Attorney, Agent, or Firm* — Cantor Colburn LLP; William Kinnaman

(57) ABSTRACT

Methods, systems and computer program products for updating a route of a vehicle based on a broadcast emergency signal are provided. Aspects include receiving, by a navigational device associated with the vehicle, the broadcast emergency signal indicating a route of an emergency vehicle and determining, by the navigational device, whether the route of the vehicle associated with the navigational device overlaps with the route of the emergency vehicle. Aspects also include determining a revised route for the vehicle based on a determination that the route of the vehicle associated with the navigational device overlaps with the route of the emergency vehicle.

13 Claims, 5 Drawing Sheets

(51) Int. Cl.

| | |
|---|---|
| *G01C 21/36* | (2006.01) |
| *G08G 1/0965* | (2006.01) |
| *G08G 1/16* | (2006.01) |
| *G05D 1/00* | (2006.01) |
| *G01C 21/00* | (2006.01) |
| *G08G 1/123* | (2006.01) |
| *G08G 1/0967* | (2006.01) |
| *G08G 1/087* | (2006.01) |
| *G05D 1/02* | (2006.01) |
| *G08G 1/00* | (2006.01) |
| *H04W 4/02* | (2018.01) |

(52) U.S. Cl.
CPC . *G08G 1/096827* (2013.01); *G08G 1/096844* (2013.01); *G01C 21/00* (2013.01); *G01C 21/34* (2013.01); *G05D 1/00* (2013.01); *G05D 1/0088* (2013.01); *G05D 1/02* (2013.01); *G05D 1/0214* (2013.01); *G08G 1/087* (2013.01); *G08G 1/0967* (2013.01); *G08G 1/096716* (2013.01); *G08G 1/123* (2013.01); *G08G 1/16* (2013.01); *G08G 1/166* (2013.01); *G08G 1/20* (2013.01); *H04W 4/027* (2013.01)

(58) Field of Classification Search
CPC ...... G08G 1/162; G08G 1/091; G08G 1/0112; G08G 1/096741; G01C 21/00; G01C 21/3415; G01C 21/3694; G01C 21/34; G01C 21/3492; G01C 21/3691; G01C 21/3697; G01C 21/3461; G01C 21/3476; H04W 4/02; H04W 4/027; H04W 4/046; G01S 19/51; G01S 19/47; G06Q 40/08; B60Q 5/006; B60W 50/14; B60W 40/10; H04L 67/12
See application file for complete search history.

(56) References Cited

U.S. PATENT DOCUMENTS

| | | | |
|---|---|---|---|
| 9,129,532 B2 | 9/2015 | Rubin et al. | |
| 9,278,689 B1 | 3/2016 | Delp | |
| 9,841,767 B1* | 12/2017 | Hayward | G08G 1/166 |
| 10,008,111 B1* | 6/2018 | Grant | G08G 1/0965 |
| 2002/0065564 A1 | 5/2002 | Sheriff et al. | |
| 2004/0196162 A1* | 10/2004 | Brooke | G08G 1/087 |
| | | | 340/906 |
| 2005/0209770 A1* | 9/2005 | O'Neill | G01C 21/3407 |
| | | | 701/117 |
| 2007/0138347 A1* | 6/2007 | Ehlers | G01C 21/3461 |
| | | | 246/1 R |
| 2010/0250111 A1* | 9/2010 | Gutierrez | G01C 21/3697 |
| | | | 701/532 |
| 2011/0181443 A1* | 7/2011 | Gutierrez | G01C 21/3691 |
| | | | 340/990 |
| 2014/0085107 A1* | 3/2014 | Gutierrez | G08G 1/096766 |
| | | | 340/905 |
| 2014/0306834 A1 | 10/2014 | Ricci | |
| 2016/0169688 A1* | 6/2016 | Kweon | G08G 1/087 |
| | | | 701/522 |
| 2017/0032670 A1* | 2/2017 | Poornachandran | |
| | | | G08G 1/096716 |
| 2017/0192429 A1* | 7/2017 | Tseng | G05D 1/0088 |

OTHER PUBLICATIONS

Disclosed Anonymously "A mechanism to detect approaching emergency vehicles using GPS information", IP.com Prior Art Database Technical Disclosure: IP.com No. IPCOM000230636D; dated Aug. 28, 2013; 4 pgs.

Disclosed Anonymously "Method and System for Driverless Emergency Vehicle Movement in Driverless Vehicle Environment", IP.com Prior Art Database Technical Disclosure: IP.com No. IPCOM000245237D; dated Feb. 19, 2016; 4 pgs.

List of IBM Patents or Patent Applictions Treated As Related; (Appendix P), Date Filed Sep. 27, 2016 2 pages.

* cited by examiner

ROUTE MODIFICATION BASED ON RECEIVING A BROADCAST EMERGENCY VEHICLE ROUTE

BACKGROUND

The present invention generally relates to broadcasting a route of an emergency vehicle, and more particularly to methods and systems for modifying a route of a vehicle based on the reception of a broadcast a route of an emergency.

Currently, when an emergency vehicle is responding to an emergency it emits a very loud siren and displays flashing lights in order to get the attention of other motorists in the vicinity. Motorists are obligated to move out of the way of emergency vehicles to allow the emergency vehicle to proceed to the location of the emergency as quickly as possible. However, motorists often have a difficult time hearing an emergency siren or determining the location of the emergency vehicle. This results in the motorist not being able to take the necessary steps to maneuver out of the way of the emergency vehicle in a timely fashion. This can lead to unnecessary delays in the emergency vehicle arriving at the location of the emergency.

In addition, with the impending proliferation of autonomous vehicles, the problem of clearing a travel route for emergency vehicles becomes more complicated as the autonomous vehicles may not be able to detect the siren being emitted from the emergency vehicle and may not know how to react to the driving pattern of an emergency vehicle.

SUMMARY

In accordance with an embodiment, a method for updating a route of a vehicle based on a broadcast emergency signal includes receiving, by a navigational device associated with the vehicle, the broadcast emergency signal indicating a route of an emergency vehicle and determining, by the navigational device, whether the route of the vehicle associated with the navigational device overlaps with the route of the emergency vehicle. The method also includes determining a revised route for the vehicle based on a determination that the route of the vehicle associated with the navigational device overlaps with the route of the emergency vehicle.

In accordance with another embodiment, a computer program product for updating a route of a vehicle based on a broadcast emergency signal is provided. The computer program product includes a non-transitory storage medium readable by a processing circuit and storing instructions for execution by the processing circuit for performing a method. The method includes receiving the broadcast emergency signal indicating a route of an emergency vehicle and determining whether the route of the vehicle overlaps with the route of the emergency vehicle. The method also includes determining a revised route for the vehicle based on a determination that the route of the vehicle overlaps with the route of the emergency vehicle.

In accordance with another embodiment, a navigational device for updating a route of a vehicle based on a broadcast emergency signal includes a processor configured to receive the broadcast emergency signal indicating a route of an emergency vehicle and to determine whether the route of the vehicle associated with the navigational device overlaps with the route of the emergency vehicle. The processor is also configured to determine a revised route for the vehicle based on a determination that the route of the vehicle associated with the navigational device overlaps with the route of the emergency vehicle.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for broadcasting a broadcast emergency signal indicating a route of an emergency vehicle and for updating a route of a vehicle based on the broadcast emergency signal. In exemplary embodiments, an emergency vehicle broadcasts an emergency signal to navigational devices within a vicinity of the emergency vehicle, which provides the navigational devices with a portion of a route of the emergency vehicle. The navigational devices use the route information for the emergency vehicle to adjust the planned route of a vehicle associated with the navigational device based on a determination that the route of the emergency vehicle overlaps with the route of the vehicle associated with the navigational device.

In exemplary embodiments, the emergency broadcast signal allows emergency vehicles, such as ambulances, firefighters, police, etc., to broadcast an emergency signal and share their planned route, or at least a part of their planned route, in real time in order to allow other vehicles and devices know their emergency path (other vehicles can tell where the emergency is coming from). In addition, the navigational devices can adjust the route path for vehicles in order to react appropriately due to the emergency and/or to adjust the route path to avoid the emergency vehicle.

Figure 1:
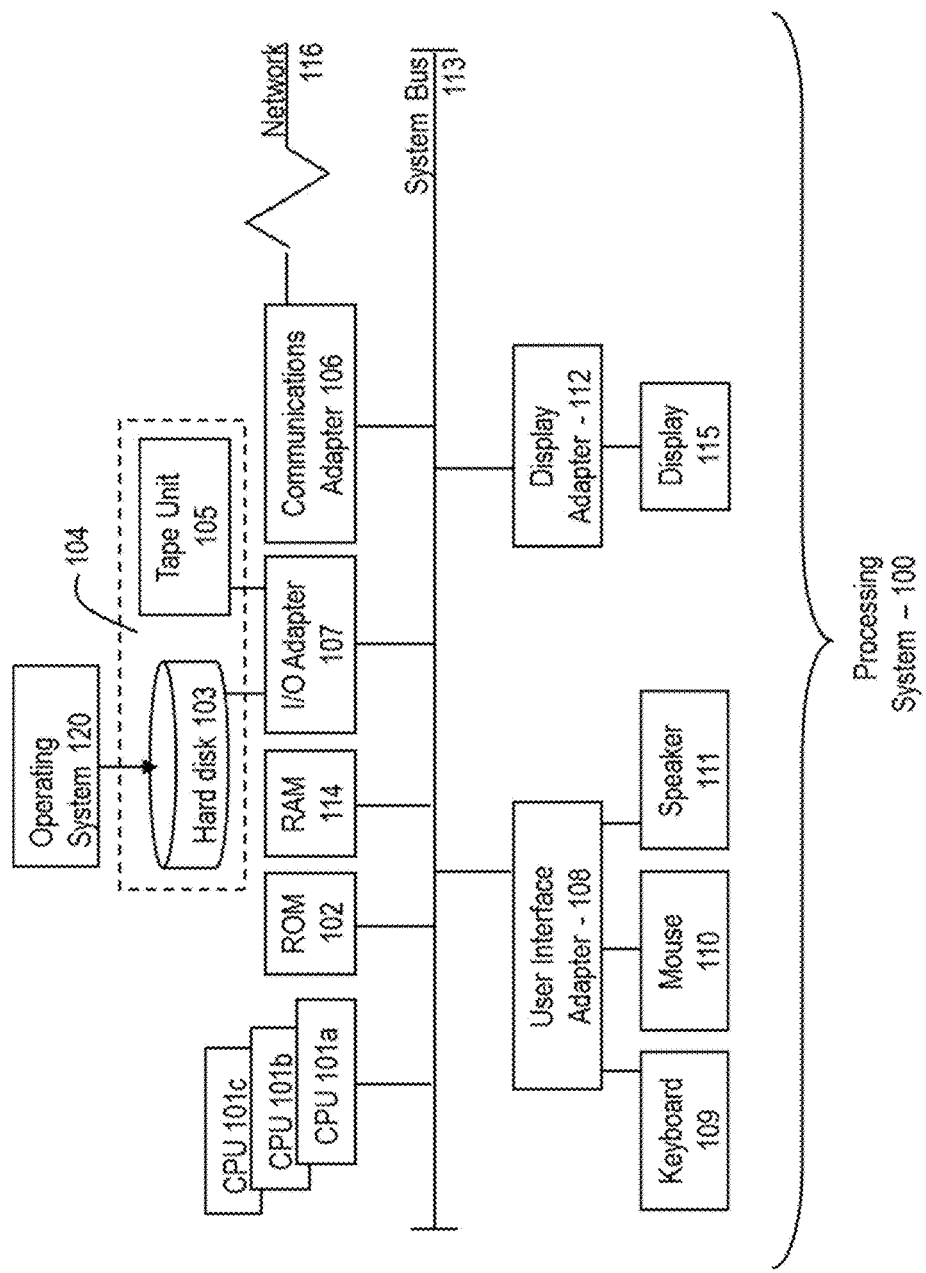
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113.

I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the processing system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
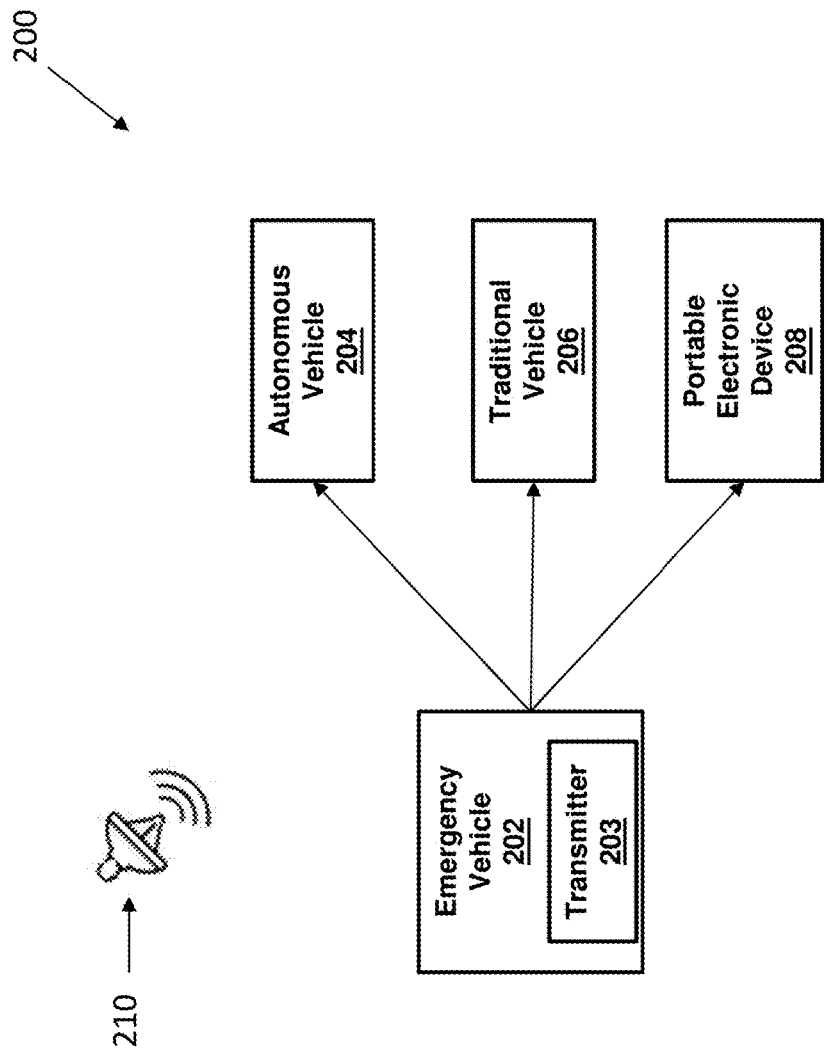
FIG. 2 is a block diagram illustrating an emergency vehicle route broadcast system in accordance with an embodiment.

Referring now to FIG. 2, there is shown an emergency vehicle route broadcast system 200 in accordance with an embodiment. As illustrated, the system 200 includes an emergency vehicle 202 that includes a transmitter 203 for broadcasting an emergency signal. In exemplary embodiments, the emergency vehicle 202 may include a processing system similar to the one shown in FIG. 2 that receives an indication of an emergency and a location of the emergency from a dispatch system (not shown). The emergency vehicle 202 also receives information from a positioning system 210, which may be global positioning system (GPS) or the like. Based on the information received information from the positioning system 210 and the location of the emergency, a route for the emergency vehicle 202 is determined. Once the route of the emergency vehicle 202 is determined, a portion of the route to broadcast is then determined. The portion of the route to broadcast can depend on a type of the emergency, a current location of the emergency vehicle 202, a speed of the emergency vehicle 202, and the like. Once the portion of the route to broadcast is determined, the emergency vehicle 202, via the transmitter 203, broadcasts an emergency signal that includes the determined portion of the route. In exemplary embodiments, the broadcast emergency signal can also include a current location of the emergency vehicle 202, a speed of the emergency vehicle 202, an indication of the type of emergency vehicle, an indication of the type of the emergency, and the like. For example, the emergency signal may indicate that the emergency vehicle is one of a police car, a fire engine, an ambulance or the like. In addition, the emergency signal may indicate that the type of the emergency is a car accident, a fire, a medical emergency at a private residence, a medical emergency at a public building, a police situation such as a robbery or the like.

In exemplary embodiments, the emergency vehicle 202 broadcasts the emergency signal with sufficient power to enable navigational devices within a desired range of the emergency vehicle 202 to receive the emergency signal. The desired range can be a fixed distance, such as one-mile, or it may be a distance that varies based on factors such as the a current location of the emergency vehicle 202, a speed of the emergency vehicle 202, and the like. For example, the desired range may increase as the speed of the emergency vehicle increases in order to adequately inform the other navigational devices that the emergency vehicle 202 may impact. In another example, the desired range may be dependent on the location of the emergency vehicle 202 and the location of the emergency or destination of the emergency vehicle 202. For example, the emergency vehicle 202 may reduce the desired range as it approaches its destination, such as the emergency location or a hospital.

In exemplary embodiments, the navigational devices that can receive the emergency signal can include an autonomous vehicle 204, a traditional vehicle 206 and a portable electronic device 208, such as a smartphone, a standalone GPS device or the like. In exemplary embodiments, the navigational devices can include user configurable settings that control how the navigational device will react to the receipt of an emergency signal. In one example, a user that lives near a hospital may configure his navigational devices to ignore emergency signals that are received when the navigational device is in an area around his home and near the hospital. In another example, a user of an autonomous vehicle 204 may configured the autonomous vehicle 204 to only automatically re-route the autonomous vehicle 204 if re-routing based on the emergency signal will not increase their estimated trip time by a threshold amount.

In exemplary embodiments, the navigational devices display a location and the route of the emergency vehicle in relation to the location of the vehicle associated with the navigational device so that a user can visualize how the emergency vehicle will affect them. In addition, in some embodiments, the navigational device may be incorporated within GPS systems of traditional and autonomous vehicles and can adjust the driving patterns, speed, etc and route according to the emergency route.

Figure 3:
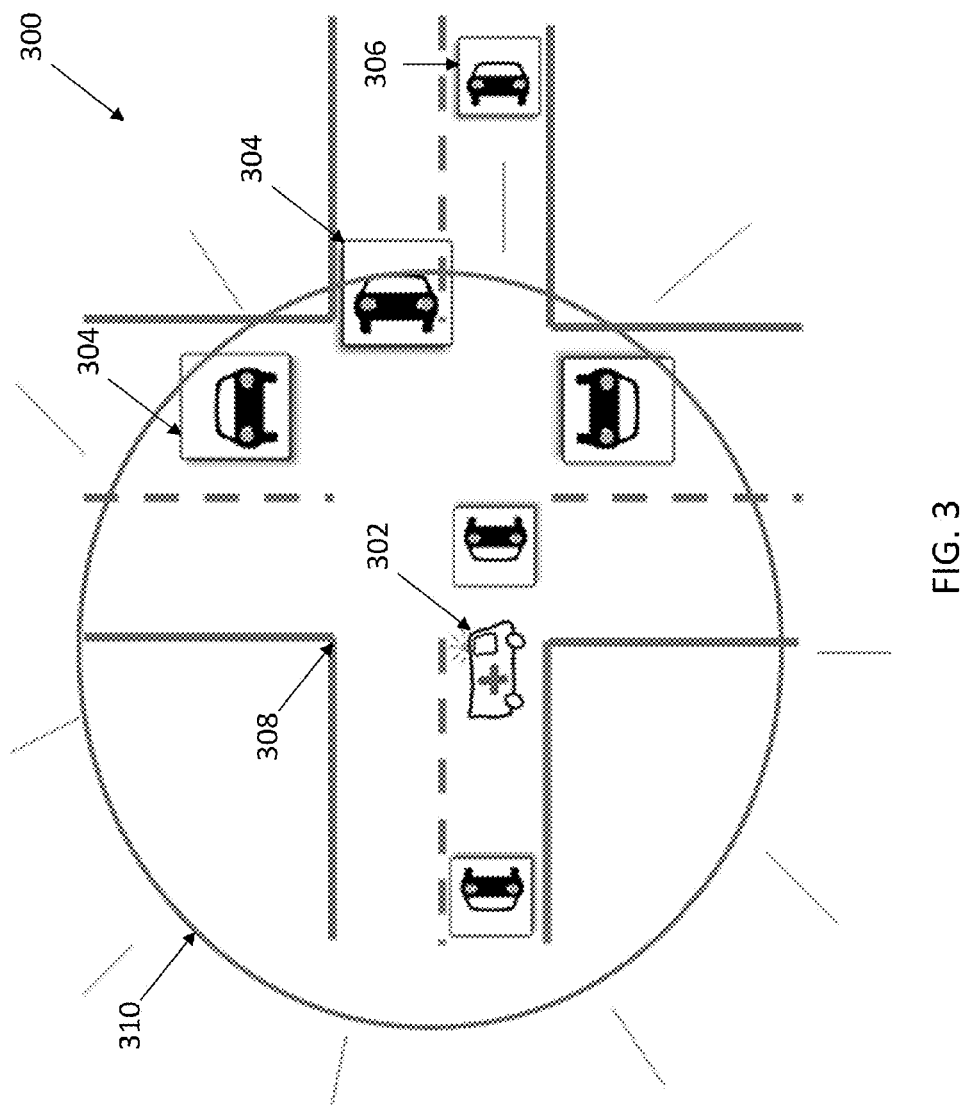
FIG. 3 is a schematic illustration of an emergency vehicle route broadcast system in accordance with an embodiment.

Referring now to FIG. 3, a schematic illustration of an emergency vehicle route broadcast system 300 in accordance with an embodiment is shown. As illustrated, the system 300 includes an emergency vehicle 302 near an intersection 308 that is broadcasting an emergency signal in area 310 around the emergency vehicle 302. The system 300 includes a plurality of vehicles 304 that are within the area 310 and which receive the broadcast emergency signal and a vehicle 306 that is outside of the area 310 and which does not receive the broadcast emergency signal.

Figure 4:
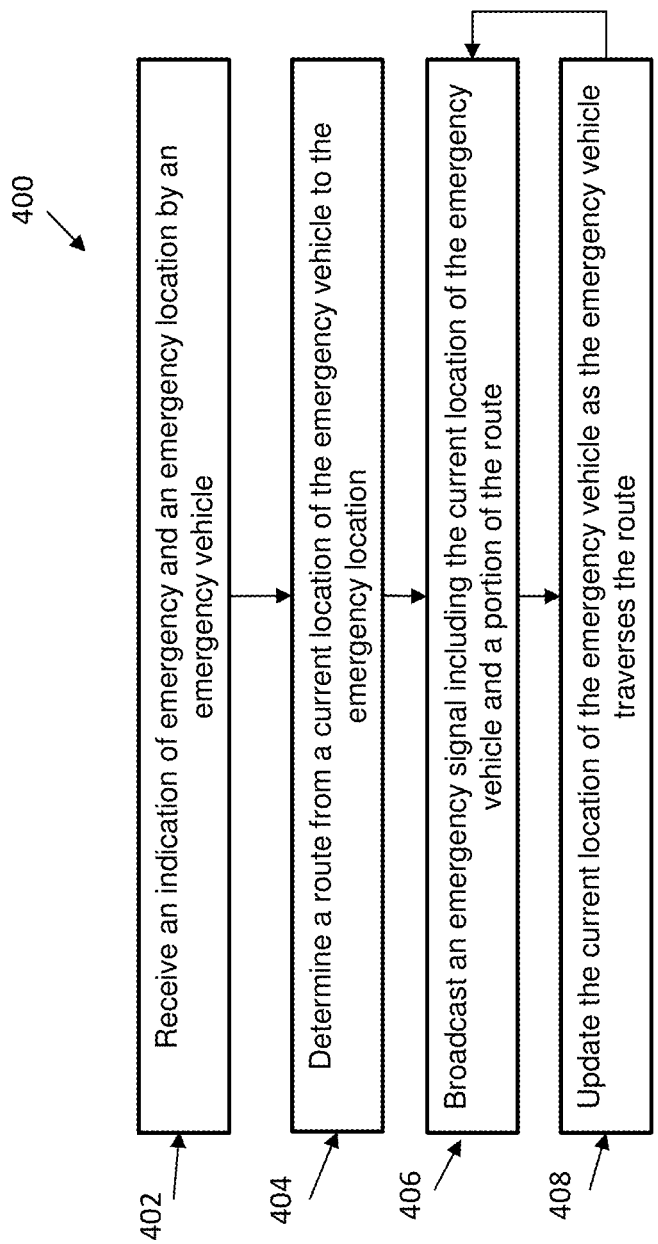
FIG. 4 shows a flow chart illustrating a method for broadcasting a broadcast emergency signal indicating a route of an emergency vehicle in accordance with an embodiment.

Referring now to FIG. 4, a flowchart illustrating a method 400 for broadcasting a broadcast emergency signal indicating a route of an emergency vehicle is shown. As shown at block 402, the method 400 includes receiving an indication of emergency and an emergency location by an emergency vehicle. In exemplary embodiments, the indication of the emergency and the emergency location may be received by an emergency vehicle from an emergency dispatch system. The method 400 also includes determining a route from a current location of the emergency vehicle to the emergency location, as shown at block 404. In exemplary embodiments, the current location of the emergency vehicle can be determined by a global positioning system (GPS) associated with the emergency vehicle and the route from the current location to the emergency location can be determined by a variety of known vehicle routing techniques. Next, as shown at block 406, the method 400 includes broadcasting an emergency signal including the current location of the emergency vehicle and a portion of the route. In exemplary embodiments, the portion of the route included in the broadcast emergency signal can be determined based on a type of the emergency, the current location of the emergency vehicle, a speed of the emergency vehicle, or the like. In exemplary embodiments, the emergency vehicle broadcasts the emergency signal with a power level sufficient to transmit the broadcast emergency signal a maximum distance. For example, the emergency vehicle can be configured to broadcast the emergency signal with a power level such that only navigational devices within one mile of the current location of the emergency vehicle can receive the emergency signal.

Continuing with reference to FIG. 4, the method 400 also includes updating the current location of the emergency vehicle as the emergency vehicle traverses the route, as shown at block 408. As the current location of the emergency vehicle is updated, the broadcast emergency signal is also updated to reflect the new location of the emergency vehicle and different portion of the route of the emergency vehicle.

Figure 5:
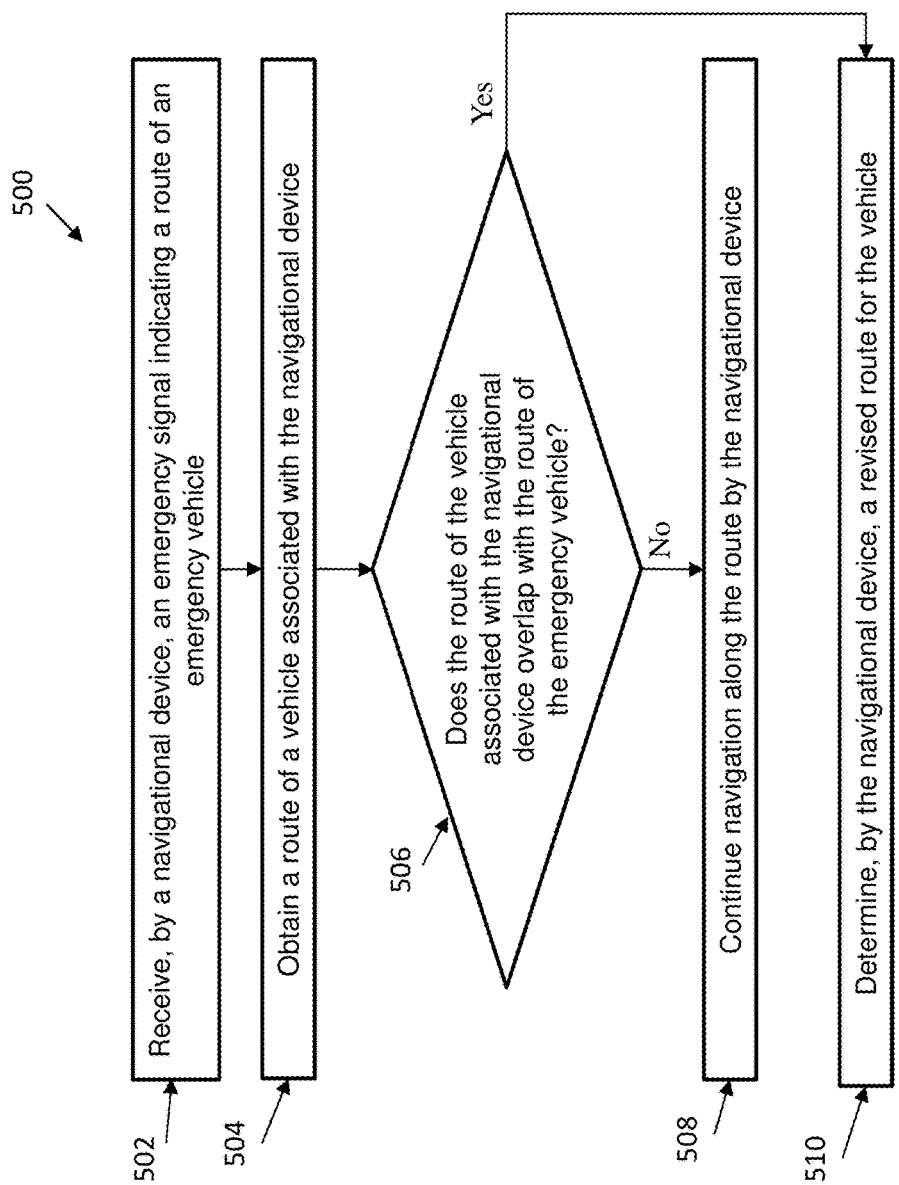
FIG. 5 shows a flow chart illustrating a method for updating a route of a vehicle based on a broadcast emergency signal in accordance with an embodiment.

Referring now to FIG. 5, a flowchart illustrating a method 500 for updating a route of a vehicle based on a broadcast emergency signal is shown. As shown at block 502, the method 500 includes receiving, by a navigational device, an emergency signal indicating a route of an emergency vehicle. In exemplary embodiments, the navigational device may be a smartphone that is being used to provide route guidance to an individual inside the vehicle, an onboard GPS system of the vehicle. In exemplary embodiments, the vehicle can be traditional user operated vehicle or it can be an autonomous vehicle. In exemplary embodiments, the navigational device includes a display configured to display the route of the vehicle associated with the navigational device and to display is further configured to display the route of the emergency vehicle. In exemplary embodiments, any overlap between the route of the vehicle associated with the navigational device and the route of the emergency vehicle can be highlighted to bring it to the attention of the user of the navigational device.

The method 500 also includes obtaining a route of a vehicle associated with the navigational device, as shown at block 504. Next, as shown at decision block 506, the method 500 includes determining whether the route of the vehicle associated with the navigational device overlap with the route of the emergency vehicle. If the route of the vehicle associated with the navigational device overlaps with the route of the emergency vehicle, the method 500 proceeds to block 510 and determines, by the navigational device, a revised route for the vehicle. In exemplary embodiments, the revised route is determined such that it minimizes the overlap of the route of the vehicle with the route of the emergency vehicle. Otherwise, the method 500 proceeds to block 508 and includes continuing navigation along the route by the navigational device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for updating a route of a vehicle based on a broadcast emergency signal, the method comprising:
    receiving, by a navigational device associated with the vehicle, the broadcast emergency signal indicating a route of an emergency vehicle, wherein the route of the emergency vehicle indicated by the broadcast emergency signal consists of a portion of a full route of the emergency vehicle, the portion being determined based on a speed of the emergency vehicle, a type of an emergency and a location of the emergency vehicle;
    determining, by the navigational device, whether the route of the vehicle associated with the navigational device overlaps with the route of the emergency vehicle; and
    based on a determination that the route of the vehicle associated with the navigational device overlaps with the route of the emergency vehicle, determining a revised route for the vehicle associated with the navigational device, wherein the revised route is determined such that it minimizes the overlap of the route of the vehicle with the route of the emergency vehicle, and
    wherein the emergency vehicle broadcasts the emergency signal with sufficient power to enable navigational devices within a desired range of the emergency vehicle to receive the emergency signal, the desired range being a distance that increases as the speed of the emergency vehicle increases and that decreases as the emergency vehicle gets closer to its destination.

2. The method of claim 1, further comprising:
    based on a determination that the route of the vehicle associated with the navigational device does not overlap with the route of the emergency vehicle, continuing navigation along the route by the navigational device.

3. The method of claim 1, wherein the broadcast emergency signal is received from the emergency vehicle.

4. The method of claim 3, wherein the emergency vehicle broadcasts the broadcast emergency signal with a power level sufficient to transmit the broadcast emergency signal a maximum distance.

5. The method of claim 1, wherein the navigational device is one of a smartphone and an onboard GPS system of the vehicle associated with the navigational device.

6. A computer program product for updating a route of a vehicle based on a broadcast emergency signal, the computer program product comprising:
    a non-transitory storage medium readable by a processing circuit and storing instructions for execution by the processing circuit for performing a method comprising:
    receiving the broadcast emergency signal indicating a route of an emergency vehicle, wherein the route of the emergency vehicle indicated by the broadcast emergency signal consists of a portion of a full route of the emergency vehicle, the portion being determined based on a speed of the emergency vehicle, a type of an emergency and a location of the emergency vehicle;
    determining whether the route of the vehicle overlaps with the route of the emergency vehicle;
    based on a determination that the route of the vehicle overlaps with the route of the emergency vehicle, determining a revised route for the vehicle, wherein the revised route is determined such that it minimizes the overlap of the route of the vehicle with the route of the emergency vehicle, and
    wherein the emergency vehicle broadcasts the emergency signal with sufficient power to enable navigational devices within a desired range of the emergency vehicle to receive the emergency signal, the desired range being a distance that increases as the speed of the emergency vehicle increases and that decreases as the emergency vehicle gets closer to its destination.

7. The computer program product of claim 6, wherein the method further comprises:
    based on a determination that the route of the vehicle does not overlap with the route of the emergency vehicle, continuing navigation along the route.

8. The computer program product of claim 6, wherein the revised route is determined such that it minimizes the overlap of the route of the vehicle with the route of the emergency vehicle.

9. A navigational device for updating a route of a vehicle associated with the navigational device based on a broadcast emergency signal, including a processor configured to:

receive the broadcast emergency signal indicating a route of an emergency vehicle, wherein the route of the emergency vehicle indicated by the broadcast emergency signal consists of a portion of a full route of the emergency vehicle, the portion being determined based on a speed of the emergency vehicle, a type of an emergency and a location of the emergency vehicle;

determine whether the route of the vehicle associated with the navigational device overlaps with the route of the emergency vehicle, based on a determination that the route of the vehicle associated with the navigational device overlaps with the route of the emergency vehicle, determine a revised route for the vehicle associated with the navigational device, wherein the revised route is determined such that it minimizes the overlap of the route of the vehicle with the route of the emergency vehicle, and wherein the emergency vehicle broadcasts the emergency signal with sufficient power to enable navigational devices within a desired range of the emergency vehicle to receive the emergency signal, the desired range being a distance that increases as the speed of the emergency vehicle increases and that decreases as the emergency vehicle gets closer to its destination.

10. The navigational device of claim 9, wherein the processor is further configured to:

based on a determination that the route of the vehicle associated with the navigational device does not overlap with the route of the emergency vehicle, continue navigation along the route by the navigational device.

11. The navigational device of claim 9, wherein the revised route is determined such that it minimizes the overlap of the route of the vehicle with the route of the emergency vehicle.

12. The navigational device of claim 9, wherein the navigational device is one of a smartphone and an onboard GPS system of the vehicle associated with the navigational device.

13. The navigational device of claim 9, wherein the navigational device further comprises a display configured to display the route of the of the vehicle associated with the navigational device and wherein the display is further configured to display the route of the emergency vehicle.

* * * * *